United States Patent
Yao et al.

(10) Patent No.: US 8,755,104 B2
(45) Date of Patent: Jun. 17, 2014

(54) ELECTROWETTING DISPLAY PANEL AND THE MANUFACTURING METHOD THEREOF

(71) Applicant: BOE Technology Group Co., Ltd., Beijing (CN)

(72) Inventors: Qi Yao, Beijing (CN); Jianshe Xue, Beijing (CN); Zhanfeng Cao, Beijing (CN); Tianming Dai, Beijing (CN); Feng Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 13/703,655

(22) PCT Filed: Oct. 16, 2012

(86) PCT No.: PCT/CN2012/083029
§ 371 (c)(1),
(2), (4) Date: Dec. 12, 2012

(87) PCT Pub. No.: WO2013/056639
PCT Pub. Date: Apr. 25, 2013

(65) Prior Publication Data
US 2013/0141775 A1    Jun. 6, 2013

(30) Foreign Application Priority Data

Oct. 18, 2011    (CN) .......................... 2011 1 0317600

(51) Int. Cl.
*G02F 1/03*      (2006.01)
*G02B 26/02*     (2006.01)

(52) U.S. Cl.
USPC ........... 359/245; 359/228; 359/253; 359/315; 359/318; 345/32; 345/41

(58) Field of Classification Search
USPC ......... 359/245, 228, 253, 290, 315, 318, 321, 359/665; 345/32, 41, 48, 84, 204, 214; 349/1, 12
See application file for complete search history.

(56) References Cited

U.S. PATENT DOCUMENTS 6,369,954 B1    4/2002    Berge et al.
6,936,196 B2    8/2005    Chandross et al.

(Continued)

FOREIGN PATENT DOCUMENTS

CN    174221 A       3/2006
CN    101359091 A    2/2009
CN    101666908 A    3/2010

(Continued)

OTHER PUBLICATIONS

International Search Report; dated Jan. 31, 2013; PCT/CN2012/083029.
First Chinese Office Action dated Oct. 14, 2013; Appln. No. 201110317600.7.

*Primary Examiner* — Tuyen Tra
(74) *Attorney, Agent, or Firm* — Ladas & Parry LLP (57) ABSTRACT

Embodiments of the present disclosure provide an electrowetting display panel and the manufacturing method thereof The electrowetting display panel comprises: a first glass substrate; a second glass substrate provided opposite to the first glass substrate; a cavity provided between the first glass substrate and the second glass substrate; a colored conductive liquid filled into the cavity; and a reflecting conductive element provided on the surface of the first glass substrate facing away from the second glass substrate, and corresponding to the cavity, wherein the reflecting conductive element is used for controlling the light transmissivity of the colored conductive liquid within the cavity according to the voltage applied to the reflecting conductive element and reflecting the light passing through the colored conductive liquid toward the second glass substrate.

20 Claims, 3 Drawing Sheets

(56) References Cited

U.S. PATENT DOCUMENTS

2003/0227100 A1 12/2003 Chandross et al.
2006/0132404 A1 6/2006 Hayes et al.
2009/0231670 A1 9/2009 Bower et al.
2013/0208331 A1* 8/2013 Kim et al. .................. 359/228

FOREIGN PATENT DOCUMENTS

CN 102707432 A 10/2012

* cited by examiner

Figure 3

ELECTROWETTING DISPLAY PANEL AND THE MANUFACTURING METHOD THEREOF

TECHNICAL FIELD

Embodiments of the present disclosure relate to an electrowetting display panel and the manufacturing method thereof.

BACKGROUND

In the configuration of an existing electrowetting display panel, a first glass substrate and a second glass substrate are placed opposite to each other with a plurality of reflecting electrodes formed on the surface of the first glass substrate facing to the second glass substrate; a dielectric layer is formed above the reflecting electrodes; and a plurality of cavities each filled with a colored conductive liquid and each corresponding to one of the reflecting electrodes are formed on the dielectric layer.

A traditional method for manufacturing an existing electrowetting display panel comprises depositing a reflecting electrode on a surface of a first glass substrate; depositing a dielectric layer above the reflecting electrode, forming a cavity on the dielectric layer, filling the cavity with a colored conductive liquid, and bonding the first glass substrate and a second glass substrate with the formed cavity located therebetween. Thus, in the traditional method for manufacturing an existing electrowetting display panel, it is necessary to deposit a special dielectric layer on a surface of the first glass substrate with reflecting electrode formed thereon.

The display principle of the above electrowetting display panel lies in that the surface free energy of the colored conductive liquid, due to the electrowetting effect or electrocapillarity, is changed under application of an electric field created by energizing the reflecting electrodes, resulting in a change in the distribution of the colored conductive liquid within the cavity on the dielectric layer and a further change in the light transmissivity of the colored conductive liquid within the cavity. In this case, light can pass through the colored conductive liquid within the cavities, travel onto the reflecting electrode and then be reflected outward by the electrode in the direction of the second substrate so as to display.

However, due to factors such as technology stability, it is difficult to control the thickness of the dielectric layer in the existing electrowetting display panel. Thus, the thickness of the dielectric layer in the existing electrowetting display panel is often uneven, leading to a display difference and thus a deteriorated display effect.

SUMMARY

An embodiment of the present invention provides an electrowetting display panel, comprising: a first glass substrate; a second glass substrate provided opposite to the first glass substrate; a cavity provided between the first glass substrate and the second glass substrate; a colored conductive liquid filled into the cavity; and a reflecting conductive element provided on the surface of the first glass substrate facing away from the second glass substrate, and corresponding to the cavity, wherein the reflecting conductive element is used for controlling the light transmissivity of the colored conductive liquid within the cavity according to the voltage applied to the reflecting conductive element and reflecting the light passing through the colored conductive liquid toward the second glass substrate.

Another embodiment of the present invention provides a manufacturing method of an electrowetting display panel, comprising steps of: forming a reflecting conductive element on a first surface of the first glass substrate; forming a cavity corresponding to the reflecting conductive element above a second surface of the first glass substrate facing away from the first surface; filling the cavity with a colored conductive liquid; bonding and sealing the second glass substrate and the first glass substrate with the cavity located therebetween, wherein the reflecting conductive element is used for controlling the light transmissivity of the colored conductive liquid within the cavity according to the voltage applied to the reflecting conductive element and reflecting the light passing through the colored conductive liquid toward the second glass substrate.

BRIEF DESCRIPTION OF THE DRAWINGS

In order to clearly illustrate the technical solution of the embodiments of the invention, the drawings needed for the description of the embodiments or the prior art will be briefly described in the following; it is obvious that the described drawings are only related to some embodiments of the invention and thus are not limitative of the invention.

DETAILED DESCRIPTION

Below, specific implementations of the embodiments of the present invention will be further described in detail in connection with the accompanying drawings. It is obvious that the below-described embodiments are just a part but not all of the embodiments of the invention. Based on the embodiments of the present invention, those skilled in the art can obtain other embodiment(s), without any inventive work, which should be within the scope of the invention.

Embodiments of the present disclosure provide an electrowetting display panel and the manufacturing method thereof, so as to improve the deteriorated display effect caused by the uneven thickness of the dielectric layer in the existing electrowetting display panel.

Figure 1:
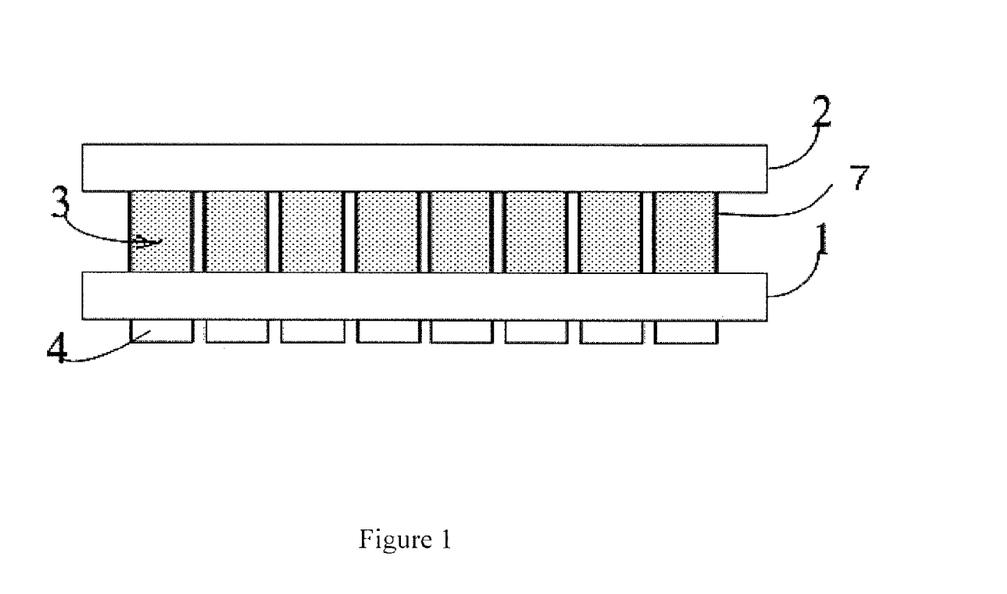
FIG. 1 is a structural schematic view showing an electrowetting display panel according to an embodiment of the present disclosure.

As shown in FIG. 1, an embodiment of the present disclosure provides an electrowetting display panel comprising a first glass substrate 1; a second glass substrate 2 provided opposite to the first glass substrate 1; a cavity 3 provided between the first glass substrate 1 and the second glass substrate 2; a colored conductive liquid 30 filled into the cavity 3; and a reflecting conductive element 4 corresponding to the cavity 3 and provided on the surface of the first glass substrate 1 facing way from the second glass substrate 2. The reflecting conductive element 4 is used for controlling the light transmissivity of the colored conductive liquid within the cavity 3 based on the voltage applied to the reflecting conductive element 4 and reflecting the light passing through the colored conductive liquid toward the second glass substrate 2. The cavity 3 is, for example, provided by insulating spacers 7. The spacers 7 are insulating resin materials, for example. There may be a plurality of cavities 3 and a plurality of reflecting conductive elements 4, one reflecting conductive element corresponding to one cavity 3. Adjacent cavities 3 may be independent of each other (as shown in FIG. 1), or they may be interconnected (not shown).

In the embodiment of the present disclosure, the light passing through the colored conductive liquid for example is the light from the surrounding environment of the electrowetting display panel. The environment light from above the second glass substrate 2 of the electrowetting display panel may pass through the second glass substrate 2, the colored conductive liquid 30 and the first glass substrate 1 and arrive at the reflecting conductive elements 4, and then be reflected out by the reflecting conductive element 4.

In the electrowetting display panel provided by the embodiment of the present disclosure, the voltage applied to the reflecting conductive element 4 can be adjusted to be zero such that the light transmissivity of the colored conductive liquid within the cavity is zero or a relative lower value, thus achieving dark-state display; or a certain voltage can be applied to the reflecting conductive element 4 such that the light transmissivity of the colored conductive liquid within the cavity become a value greater than zero or a relatively higher value, thus achieving bright-state display.

In the electrowetting display panel provided by the embodiment of the present disclosure, the reflecting conductive element 4 is provided on the surface of the first glass substrate facing away from the second glass substrate. Thus, the first glass substrate in the electrowetting display panel according to the embodiment of the present disclosure, instead of the dielectric layer specially provided in the existing electrowetting display panel, functions as a dielectric layer, since the glass substrate itself is a dielectric material. Then, the light transmissivity of the colored conductive liquid within the cavity can be controlled by the reflecting conductive element, and the light passing through the colored conductive liquid can be reflected toward the second glass substrate so as to display. Compared with the dielectric layer of the existing electrowetting display panel, the first glass substrate in this embodiment is smoother, and its thickness tends to be more uniform. Therefore, display difference is less likely to occur in the electrowetting display panel provided by the embodiment of the present disclosure, thus obtaining a better display effect.

Figure 2A:
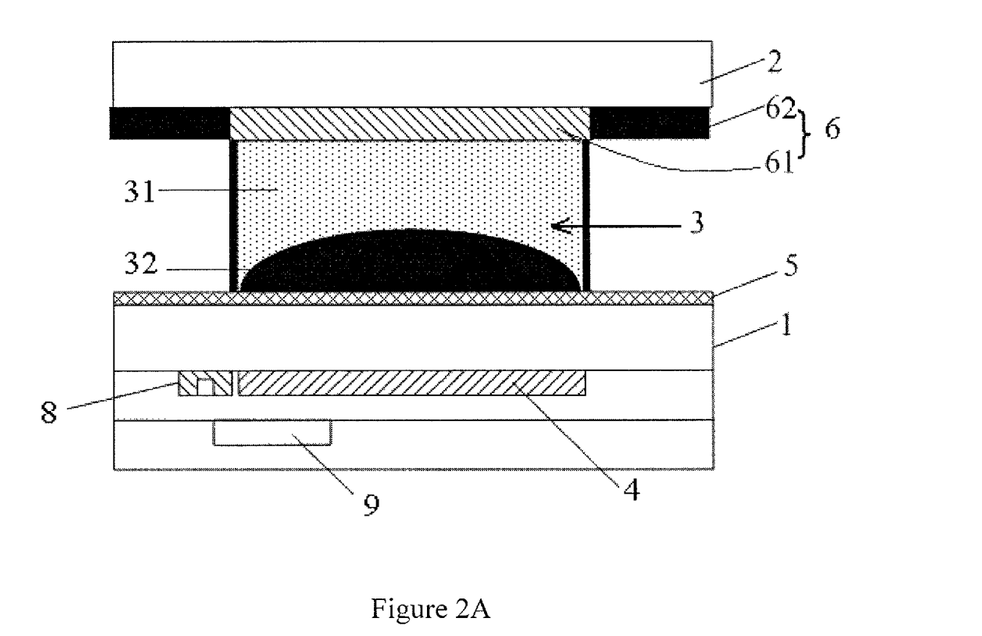
FIG. 2A is a partial structural schematic view showing an electrowetting display panel according to another embodiment of the present disclosure, when no voltage is applied to its reflecting conductive element.

As shown in FIG. 2A, the colored conductive liquid 30 can be embodied as a liquid mixture of a transparent polar liquid 31 and a colored non-polar liquid 32. The colored non-polar liquid 32 is preferably black. The ratio of the transparent polar liquid 31 to the colored non-polar liquid 32 within the cavity may be set as required. Preferably, the transparent polar liquid and the colored non-polar liquid within the cavity are equal in volume. The transparent polar liquid may be water or transparent aqueous solution such as NaCl or KCl solution. The colored non-polar liquid may be oil material, such as silicone oil, dissolved with colored pigment (preferably, black). As shown in FIG. 2A, the electrowetting display panel may further comprise a hydrophobic layer 5 located between the colored conductive liquid 30 and the first glass substrate 1. The hydrophobic layer 5 may be made of hydrophobic materials having low surface energy, such as polytetrafluoroethylene.

Figure 2B:
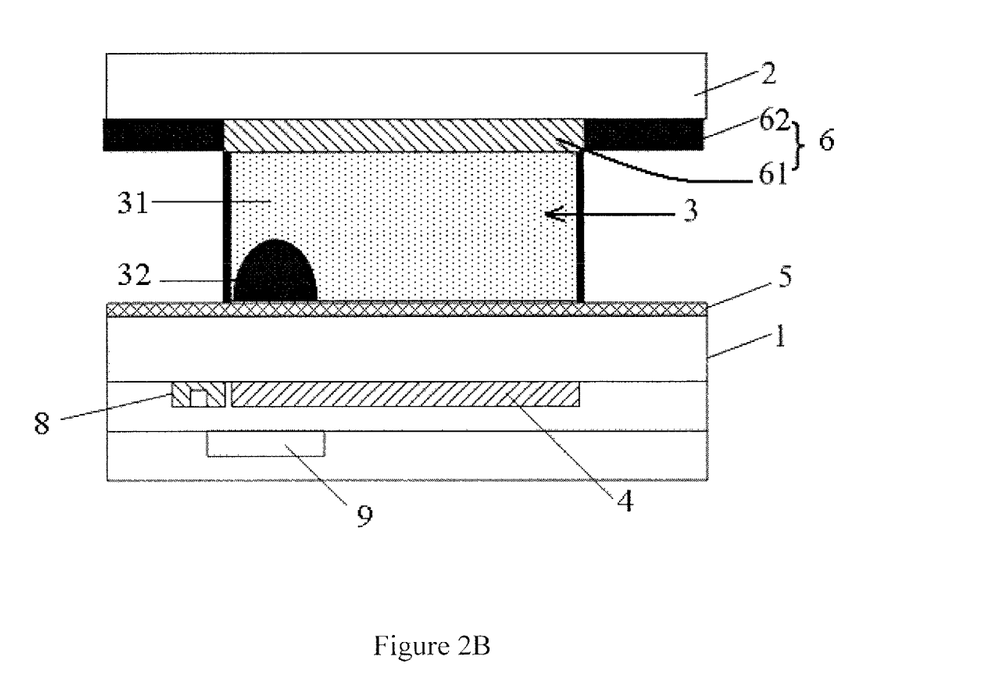
FIG. 2B is a partial structural schematic view showing the electrowetting display panel of FIG. 2A, when a certain voltage is applied to its reflecting conductive element.

When no voltage is applied to the reflecting conductive element 4, the quantity of electric charge on the reflecting conductive element is about zero. In this case, the hydrophobic layer, due to its hydrophobicity, is completely covered by the colored non-polar liquid 32 without wetted by the transparent polar liquid 31 such as a transparent aqueous solution, as shown in FIG. 2A. Therefore, there is no light or only a small amount of light impinging onto the reflecting conductive elements, and no light or only a small amount of light is reflected by the reflecting conductive element. When a certain voltage is applied to the reflecting conductive element. the amount of the electric charge on the reflecting conductive element may increase to a certain nonzero value. In this case, the surface wetting characteristics of the hydrophobic layer 5 with the colored conductive liquid 30 is altered such that the hydrophobic layer can be wetted by the transparent polar liquid 31. Therefore, the transparent polar liquid 31 can come into contact with the hydrophobic layer 5, with the colored non-polar liquid 32 pushed aside, as shown in FIG. 2B. As a result, not only the light transmissivity of the colored conductive liquid 30 is increased, but also a portion of the reflecting conductive element 4 is exposed. The light passing through the colored conductive liquid 30 may impinge onto the exposed portion of the reflecting conductive element 4 and is reflected toward the second glass substrate by the exposed portion of the reflecting conductive element 4, so as to display. A color filter further provided on the second glass substrate may result in color display. For example, the voltage applied to the reflecting conductive element 4 can be adjusted so as to control the amount of the electric charge on the reflecting conductive element and thus the size of the area, wetted by the transparent polar liquid 31, of the hydrophobic layer. In this way, the amount of the light to be reflected by the reflecting conductive element 4 can be controlled to achieve multiformity of display.

As shown in FIG. 2A, in order to achieve color display, the electrowetting display panel described above may further comprises a color filter 6 located between the colored conductive liquid 30 and the second glass substrate 2. The color filter 6 comprises a sub-pixel 61 corresponding to the cavity 3 and a black matrix 62 provided at the left and right sides of the sub-pixel 61, as shown in FIG. 2A.

The sub-pixel 61 can be a sub-pixel of three-primary color or other multicolor. In this case, the light passing through the colored conductive liquid 30 within the cavity 3 and reflected toward the second glass substrate 2 by the reflecting conductive element 4 will pass through the sub-pixel 61 of the color filter, thereby achieving color display.

Preferably, the reflecting conductive element 4 may be embodied as the drain electrode 4 of a thin film transistor.

Back to FIG. 2A, the thin film transistor includes, for example, a gate electrode 9, a source electrode 8 and a reflecting drain electrode 4.

The drain electrode 4 corresponding to the cavity 3 is formed on the surface of the first glass substrate 1 facing away from the second glass substrate 2.

The source electrode 8 is formed on the surface of the first glass substrate 1 facing away from the second glass substrate 2;

The gate electrode is formed on the side of the source electrode 8 or the drain electrode 4 facing away from the first glass substrate 1. In this embodiment, the gate electrode 9 can be formed below the source electrode 8 and the drain electrode 4.

For example, a semiconductor layer and a source and drain protective layer (the semiconductor layer and the source and drain protective layer are simply shown as one layer in FIGS. 2A and 2B) are successively provided between the source electrode 8 and the drain and gate electrodes 4 and 9. A gate protective layer can further provided onto the gate electrode 9.

When no voltage is applied to the gate electrode 9, no conductive passage is formed between the source electrode and the drain electrode. Thus, the amount of electric charge on the drain electrode is about zero. In this case, the hydrophobic layer 5, due to its hydrophobicity, is completely covered by the colored non-polar liquid 32, without being wetted by the transparent polar liquid 31. Therefore, there is no or only a small amount of light impinging onto the drain electrode 9, and the drain electrode 9 reflects no or only a small amount of light. When a certain voltage is applied to the gate electrode 9, a conductive passage is formed between the source electrode and the drain electrode, and the amount of electric charge on the drain electrode can increase to a certain nonzero value. Therefore, the wetting characteristic of the surface of the hydrophobic layer 5 with the colored conductive liquid 30 is changed such that the hydrophobic layer can be wetted by the transparent polar liquid. In this case, the transparent polar liquid 31 approaches and contacts the hydrophobic layer 5 underneath, thus pushing the colored non-polar liquid 32 aside. Therefore, not only the light transmissivity of the colored conductive liquid 30 is increased, but also a portion of the drain electrode 4 is exposed. The light passing through the colored conductive liquid 30 impinges onto the exposed portion of the drain electrode 4 and is reflected toward the second glass substrate by the exposed portion of the drain electrode, thus achieving display. A color filter 5 further provided on the second glass substrate 2 may lead to color display.

Additionally, as shown in FIG. 2A, a via hole may be further formed above the source electrode 8. The via hole is used for the connection with a peripheral driver circuit.

Figure 3:
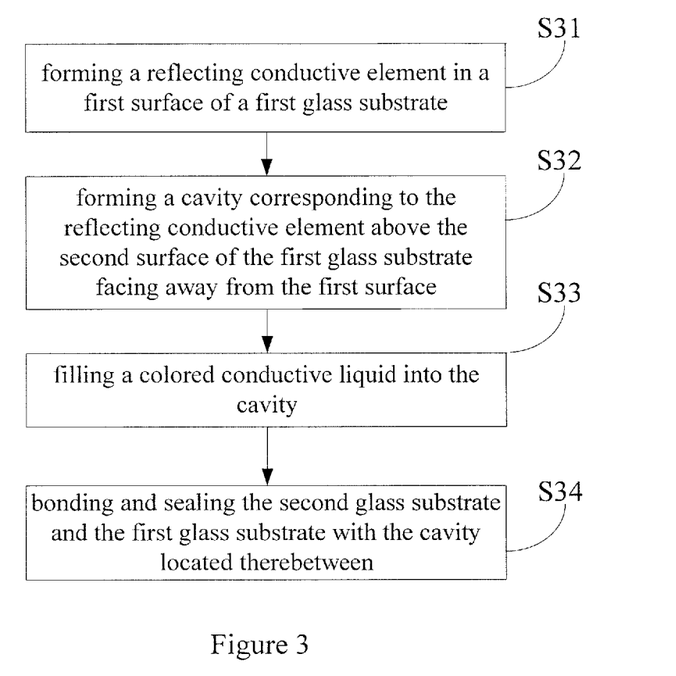
FIG. 3 is a flow chart of a method for manufacturing an electrowetting display panel according to an embodiment of the present disclosure.

Corresponding to the electrowetting display panel provided by the embodiment of the present disclosure, an embodiment of the present disclosure further provide a method for manufacturing the electrowetting display panel, comprising the following steps, as shown in FIG. 3:

Step S31: forming a reflecting conductive element on a first surface of a first glass substrate.

The reflecting conductive element can be embodied as the drain electrode of a thin film transistor. In this case, the step S31 may further comprise the following steps A1-A2:

Step A1: forming a source electrode and a reflecting drain electrode on the first surface of the first glass substrate, forming a semiconductor layer on the source electrode and the drain electrode, and forming a source and drain protective layer on the semiconductor layer;

The materials of the source electrode and the drain electrode may be single-layer metal of Al or Cu or the like, metal alloy of Al and Nd and the like, or multi-layer metals of Mo/Al and the like. The materials of the semiconductor layer may be semiconductor materials having high mobility, such as IZO or IGZO. The material of the source and drain protective layer may be inorganic passivation layer materials such as $SiN_x$, $SiO_2$, or organic passivation layer materials.

Step A2: forming a gate electrode on the side of the source electrode or the drain electrode facing away from the first glass substrate, and forming a gate protective layer on the gate electrode. The material of the gate electrode is the same as that of the source electrode and the drain electrode, and the material of the gate protective layer is the same as that of the source and drain protective layer.

In addition, after the step A2, a via hole used for connection with peripheral driver circuits may further formed onto the source electrode (for example, by a patterning process).

Step S32: forming a cavity corresponding to the reflecting conductive element above the second surface of the first glass substrate facing away from the first surface.

The cavity can be provided by insulating resin material.

Step S33: filling a colored conductive liquid into the cavity.

The colored conductive liquid herein may be the same as the colored conductive liquid describe above, thus omitting the detailed explanation thereof.

If the colored conductive liquid is a liquid mixture of a transparent polar solution and a colored non-polar liquid, the volume of the transparent polar solution to be filled into the cavity is preferably the same as that of the colored non-polar liquid to be filled into the cavity.

Here, preferably, before the step S32, a hydrophobic layer may be further formed on the second surface of the first glass substrate. The material of the hydrophobic layer may be a hydrophobic material having low surface energy, such as polytetrafluorethylene.

Step S34: bonding and sealing the second glass substrate and the first glass substrate with the cavity thus formed located therebetween. The reflecting conductive element is used to, according to the voltage applied thereto, adjust the light transmissivity of the colored conductive liquid within the cavity and reflect the light passing through the colored conductive liquid toward the second glass substrate.

Furthermore, before step S34, a color filter may be further provided on a surface of the second glass substrate so as to achieve color display. Here, the step S34 may be embodied as bonding and sealing the second glass substrate and the first glass substrate with the cavity and the color filter located therebetween.

By the expression "bonding and sealing the second glass substrate and the first glass substrate", it is meant that the second glass substrate and the first glass substrate are bonded together by sealing adhesives. After bonding and sealing the second glass substrate and the first glass substrate, connections with the peripheral driver circuit can be further made.

The operating principle of the electrowetting display panel manufactured by the above method provided by the embodiment of the present disclosure is same as the principle described previously, thus omitting the detailed description thereof.

In the method for manufacturing an electrowetting display panel provided by the embodiment of the present disclosure, the first glass substrate, due to its dielectric characteristic, can also function as a dielectric layer by providing the reflecting conductive element on the surface of the first glass substrate facing away from the second glass substrate, thus omitting the formation of a special dielectric layer in the existing method. In the electrowetting display panel manufactured by the method according to the embodiments of the present disclosure, the reflecting conductive element is used to control the light transmissivity of the colored conductive liquid within the cavity and reflect the light passing through the colored conductive liquid toward the second glass substrate, thus achieving display. Since the first glass substrate is smoother than the special dielectric layer formed in the existing electrowetting display panel, the electrowetting display panel manufactured by the manufacturing method according to the embodiment of the present disclosure is less likely to produce a display difference. thus providing an excellent display performance. Moreover, since it is not necessary to form a dielectric layer individually in the manufacturing method provided by the embodiments of the present disclosure, the electrowetting display panels according to the embodiments of the present disclosure can be manufactured in less time and at lower cost.

According to the descriptions above, the embodiments of the present disclosure may at least provide configurations and methods as below.

(1) An electrowetting display panel, comprising:
a first glass substrate;
a second glass substrate provided opposite to the first glass substrate;
a cavity provided between the first glass substrate and the second glass substrate;
a colored conductive liquid filled into the cavity; and
a reflecting conductive element provided on the surface of the first glass substrate facing away from the second glass substrate, and corresponding to the cavity, wherein the reflecting conductive element is used for controlling the light transmissivity of the colored conductive liquid within the cavity according to the voltage applied to the reflecting conductive element and reflecting the light passing through the colored conductive liquid toward the second glass substrate.

(2) The electrowetting display panel according to (1), wherein the colored conductive liquid is a liquid mixture of a transparent polar liquid and a colored non-polar liquid.

(3) The electrowetting display panel according to (2), further comprising a hydrophobic layer located between the colored conductive liquid and the first glass substrate.

(4) The electrowetting display panel according to any one of (1) to (3), further comprising a color filter located between the colored conductive liquid and the second glass substrate, wherein the color filter has a sub-pixel corresponding to the cavity.

(5) The electrowetting display panel according to any one of (1) to (3), further comprising a thin film transistor including a gate electrode, a source electrode and a reflecting drain electrode, wherein the drain electrode used as the reflecting conductive element is formed on the surface of the first glass substrate facing away from the second glass substrate, corresponding to the cavity; the source electrode is formed on the surface of the first glass substrate facing away from the second glass substrate; the gate electrode is formed on the side of the source electrode or the drain electrode facing away from the first glass substrate.

(6) The electrowetting display panel according to (5), wherein a via hole is formed on the source electrode.

(7) A manufacturing method of an electrowetting display panel, comprising steps of:
forming a reflecting conductive element on a first surface of the first glass substrate;
forming a cavity corresponding to the reflecting conductive element above a second surface of the first glass substrate facing away from the first surface;
filling a colored conductive liquid into the cavity;
bonding and sealing the second glass substrate and the first glass substrate with the cavity located therebetween,
wherein the reflecting conductive element is used for controlling the light transmissivity of the colored conductive liquid within the cavity according to the voltage applied to the reflecting conductive element and reflecting the light passing through the colored conductive liquid toward the second glass substrate.

(8) The manufacturing method according to (7), wherein the colored conductive liquid is a liquid mixture of a transparent polar liquid and a colored non-polar liquid.

(9) The manufacturing method according to (8), further comprising a step of forming a hydrophobic layer on the second surface of the first glass substrate before the step of forming the cavity corresponding to the reflecting conductive element above the second surface of the first glass substrate facing away from the first surface.

(10) The method according to any one of (7) to (9), further comprising a step of forming a color filter on a surface of the second glass substrate before the step of bonding and sealing the second glass substrate and the first glass substrate with the cavity located therebetween,
wherein the step of bonding and sealing the second glass substrate and the first glass substrate with the cavity located therebwteen is performed by bonding and sealing the second glass substrate and the first glass substrate with the cavity and the color filter located therebetween.

(11) The manufacturing method according to any one of (7) to (9), wherein the reflecting conductive element is the drain electrode of a thin film transistor,
the step of forming the reflecting conductive element on the first surface of the first glass substrate comprises steps of: forming the source electrode and the reflecting drain electrode on the first surface of the first glass substrate; forming a semiconductor layer on the source electrode and the drain electrode; forming a source and drain protective layer on the semiconductor layer; fowling the gate electrode on the side of the source electrode or the drain electrode facing away from the first glass substrate, and forming a gate protective layer on the gate electrode.

(12) The manufacturing method according to (17), further comprising a step of forming a via hole on the source electrode after the steps of forming the gate electrode on the side of the source electrode or the drain electrode facing away from the first glass substrate and forming the gate protective layer on the gate electrode.

Obviously, the skilled in the art can make various alterations and modifications to the embodiments of the present invention, without departing from the spirit and the scope of the invention. Thus, in case that these alterations and modifications belong to the scope of the claims and their equivalents of the present invention, the embodiments of the invention are also intended to encompass these alterations and modifications.

What is claimed is:

1. An electrowetting display panel comprising:
a first glass substrate;
a second glass substrate provided opposite to the first glass substrate;
a cavity provided between the first glass substrate and the second glass substrate;
a colored conductive liquid filled into the cavity; and
a reflecting conductive element provided on the surface of the first glass substrate facing away from the second glass substrate, and corresponding to the cavity, wherein the reflecting conductive element is used for controlling the light transmissivity of the colored conductive liquid within the cavity according to the voltage applied to the reflecting conductive element and reflecting the light passing through the colored conductive liquid toward the second glass substrate.

2. The electrowetting display panel according to claim 1, wherein the colored conductive liquid is a liquid mixture of a transparent polar liquid and a colored non-polar liquid.

3. The electrowetting display panel according to claim 2, further comprising a hydrophobic layer located between the colored conductive liquid and the first glass substrate.

4. The electrowetting display panel according to claim 3, further comprising a color filter located between the colored conductive liquid and the second glass substrate, wherein the color filter has a sub-pixel corresponding to the cavity.

5. The electrowetting display panel according to claim 3, further comprising a thin film transistor including a gate electrode, a source electrode and a reflecting drain electrode, wherein the drain electrode used as the reflecting conductive element is formed on the surface of the first glass substrate facing away from the second glass substrate, corresponding to the cavity;

the source electrode is formed on the surface of the first glass substrate facing away from the second glass substrate;

the gate electrode is formed on the side of the source electrode or the drain electrode facing away from the first glass substrate.

6. The electrowetting display panel according to claim 2, further comprising a color filter located between the colored conductive liquid and the second glass substrate, wherein the color filter has a sub-pixel corresponding to the cavity.

7. The electrowetting display panel according to claim 2, further comprising a thin film transistor including a gate electrode, a source electrode and a reflecting drain electrode, wherein the drain electrode used as the reflecting conductive element is formed on the surface of the first glass substrate facing away from the second glass substrate, corresponding to the cavity;

the source electrode is formed on the surface of the first glass substrate facing away from the second glass substrate;

the gate electrode is formed on the side of the source electrode or the drain electrode facing away from the first glass substrate.

8. The electrowetting display panel according to claim 1, further comprising a color filter located between the colored conductive liquid and the second glass substrate, wherein the color filter has a sub-pixel corresponding to the cavity.

9. The electrowetting display panel according to claim 1, further comprising a thin film transistor including a gate electrode, a source electrode and a reflecting drain electrode, wherein the drain electrode used as the reflecting conductive element is formed on the surface of the first glass substrate facing away from the second glass substrate, corresponding to the cavity;

the source electrode is formed on the surface of the first glass substrate facing away from the second glass substrate;

the gate electrode is formed on the side of the source electrode or the drain electrode facing away from the first glass substrate.

10. The electrowetting display panel according to claim 9, wherein a via hole is formed on the source electrode.

11. A manufacturing method of an electrowetting display panel, comprising steps of:

forming a reflecting conductive element on a first surface of the first glass substrate;

forming a cavity corresponding to the reflecting conductive element above a second surface of the first glass substrate facing away from the first surface;

filling a colored conductive liquid into the cavity;

bonding and sealing the second glass substrate and the first glass substrate with the cavity located therebetween, wherein the reflecting conductive element is used for controlling the light transmissivity of the colored conductive liquid within the cavity according to the voltage applied to the reflecting conductive element and reflecting the light passing through the colored conductive liquid toward the second glass substrate.

12. The manufacturing method according to claim 11, wherein the colored conductive liquid is a liquid mixture of a transparent polar liquid and a colored non-polar liquid.

13. The manufacturing method according to claim 12, further comprising a step of forming a hydrophobic layer on the second surface of the first glass substrate before the step of forming the cavity corresponding to the reflecting conductive element above the second surface of the first glass substrate facing away from the first surface.

14. The manufacturing method according to claim 13, further comprising a step of forming a color filter on a surface of the second glass substrate before the step of bonding and sealing the second glass substrate and the first glass substrate with the cavity located therebetween, wherein the step of bonding and sealing the second glass substrate and the first glass substrate with the cavity located therebwteen is performed by bonding and sealing the second glass substrate and the first glass substrate with the cavity and the color filter located therebetween.

15. The manufacturing method according to claim 13, wherein the reflecting conductive element is the drain electrode of a thin film transistor, the step of forming the reflecting conductive element on the first surface of the first glass substrate comprises steps of: forming the source electrode and the reflecting drain electrode on the first surface of the first glass substrate; forming a semiconductor layer on the source electrode and the drain electrode; forming a source and drain protective layer on the semiconductor layer; forming the gate electrode on the side of the source electrode or the drain electrode facing away from the first glass substrate, and forming a gate protective layer on the gate electrode.

16. The manufacturing method according to claim 12, further comprising a step of forming a color filter on a surface of the second glass substrate before the step of bonding and sealing the second glass substrate and the first glass substrate with the cavity located therebetween, wherein the step of bonding and sealing the second glass substrate and the first glass substrate with the cavity located therebwteen is performed by bonding and sealing the second glass substrate and the first glass substrate with the cavity and the color filter located therebetween.

17. The manufacturing method according to claim 12, wherein the reflecting conductive element is the drain electrode of a thin film transistor, the step of forming the reflecting conductive element on the first surface of the first glass substrate comprises steps of: forming the source electrode and the reflecting drain electrode on the first surface of the first glass substrate; forming a semiconductor layer on the source electrode and the drain electrode; forming a source and drain protective layer on the semiconductor layer; forming the gate electrode on the side of the source electrode or the drain electrode facing away from the first glass substrate, and forming a gate protective layer on the gate electrode.

18. The method according to claim 11, further comprising a step of forming a color filter on a surface of the second glass substrate before the step of bonding and sealing the second glass substrate and the first glass substrate with the cavity located therebetween, wherein the step of bonding and sealing the second glass substrate and the first glass substrate with the cavity located therebwteen is performed by bonding and sealing the second glass substrate and the first glass substrate with the cavity and the color filter located therebetween.

19. The manufacturing method according to claim 11, wherein the reflecting conductive element is the drain electrode of a thin film transistor, the step of forming the reflecting conductive clement on the first surface of the first glass substrate comprises steps of: forming the source electrode and the reflecting drain electrode on the first surface of the first glass substrate; forming a semiconductor layer on the source electrode and the drain electrode; forming a source and drain protective layer on the semiconductor layer; forming the gate electrode on the side of the source electrode or the drain electrode facing away from the first glass substrate, and forming a gate protective layer on the gate electrode.

20. The manufacturing method according to claim 19, further comprising a step of forming a via hole on the source electrode after the steps of forming the gate electrode on the side of the source electrode or the drain electrode facing away from the first glass substrate and forming the gate protective layer on the gate electrode.

* * * * *